United States Patent [19]
Horowitz

[11] 4,005,331
[45] Jan. 25, 1977

[54] HIGH INTENSITY DISCHARGE LAMP WITH AUXILIARY LIGHT

[75] Inventor: Victor Horowitz, Oceanside, N.Y.

[73] Assignee: Current Industries, Inc., Oceanside, N.Y.

[22] Filed: Oct. 8, 1974

[21] Appl. No.: 513,064

Related U.S. Application Data

[63] Continuation-in-part of Ser. No. 371,503, June 19, 1973, abandoned.

[52] U.S. Cl. .................. 315/92; 315/93; 315/136
[51] Int. Cl.² .......................... H05B 41/46
[58] Field of Search ............... 315/88, 89, 93, 87, 315/92, 131, 136, 322

[56] References Cited

UNITED STATES PATENTS

| 2,592,165 | 4/1952 | McDermott | 315/89 |
| 3,517,254 | 6/1970 | McNamara, Jr. | 315/93 X |
| 3,599,036 | 8/1971 | Haymaker | 315/93 |
| 3,659,146 | 4/1972 | Munson | 315/93 X |
| 3,694,692 | 9/1972 | Pressman | 315/154 |
| 3,699,382 | 10/1972 | Franke | 315/92 |
| 3,737,720 | 6/1973 | Willis | 315/91 |

Primary Examiner—Eugene La Roche
Attorney, Agent, or Firm—McAulay, Fields, Fisher & Goldstein

[57] ABSTRACT

An emergency lighting system, employing a mercury lamp and an incandescent lamp, and relay circuits for turning on the incandescent lamp in substitution for the mercury lamp, when the light output of the latter is limited, during either cold start or hot start, and for turning off the incandescent lamp without chatter.

3 Claims, 5 Drawing Figures

HIGH INTENSITY DISCHARGE LAMP WITH AUXILIARY LIGHT

This application is a continuation-in-part of application Ser. No. 371,503, filed June 19, 1973, and entitled "Mercury Vapor Lamp with Auxiliary Light Source", now abandoned.

BACKGROUND OF THE INVENTION

It is well known to employ lighting circuits in which an incandescent lamp is normally connected to a line so that it illuminates immediately when the line is supplied with power. A mercury lamp is also connected to the line. It is initially in a cold start condition and requires time to achieve full illumination, whereupon the voltage impressed upon it reaches approximately 135. volts. This increasing voltage is sensed and effects opening of the normally closed circuit of the incandescent lamp. Whenever the mercury lamp is de-energized, as by momentary power failure, its re-firing, now under hot start condition, requires about 5 minutes. During this period, the incandescent lamp is turned on. A system of this type is disclosed in the patents to Haymaker, No. 3,599,036 and Willis, Jr., No. 3,737,720.

Presently employed high pressure mercury vapor lamps of the type frequently employed for street lamps, in gymnasiums, and in stadiums, usually do not reach peak illumination levels until activated for several minutes by an a.c. source. These lamps are also characterized by a lack of illumination for several minutes in response to even a momentary interruption in the a.c. voltage applied to the mercury vapor lamp, as can occur in response to a momentary power shortage or in response to accidental open circuiting of a switch between the power source and mercury vapor lamp. The former and latter low illumination periods are frequently referred to in the art as cold start and hot start conditions, respectively.

There have been numerous systems developed in the prior art to energize an auxiliary lamp, such as an incandescent lamp, during the cold and hot start periods. Some of these prior art systems have included timing circuits for controlling the energization of the auxiliary lamp, while others have included photocells responsive to the illumination level of the mercury vapor lamp.

Some systems include circuitry for detecting the voltage levels across the mercury vapor lamp and a capacitor in a ballast circuit for driving the mercury vapor lamp. During cold start and prior to full illumination of the mercury vapor lamp, the voltage drop across the mercury vapor lamp is below a predetermined level, while the voltage across the capacitor is less than a predetermined level during hot start conditions.

For one particular frequently utilized mercury vapor lamp powered by a 120. volt a.c. source through a typical circuit including a saturable reactor and ballast capacitor, the voltage applied to the mercury vapor lamp is approximately 15. volts immediately after the application of power to the saturable reactor during cold start conditions and, thereafter, builds up gradually over a time period of several minutes, approximately 5 minutes, to approximately 135. volts. During the entire cold start condition and while the mercury vapor lamp is illuminated during normal operation, the a.c. voltage across the ballast capacitor is approximately 420. volts. During hot start conditions, there is initially a very low voltage, on the order of 10. volts, across the ballast capacitor, while a voltage of approximately 270. volts initially exists across the mercury vapor lamp. After several minutes have elapsed the mercury vapor lamp again restrikes, and illumination therefrom begins to increase. Full illumination of the mercury vapor lamp, however, is not achieved until several additional minutes have elapsed. At full illumination 420. volts is developed across the capacitor electrodes and approximately 135. volts is developed across the mercury vapor lamp.

SUMMARY OF THE INVENTION

The invention utilizes a relay having a coil which responds to the voltage across a M.V. lamp, and which has normally closed contacts in series with an incandescent lamp and a source of a.c. power, the operating coil of the relay being subject to the voltage across the M.V. lamp and being voltage sensitive so that its contacts open when the voltage across the M.V. lamp achieves a predetermined value indicating that it has illuminated. The relay is a no-chatter relay, which assures that only one opening will occur during slow rise of the a.c. voltage across the M.V. lamp.

DETAILED DESCRIPTION OF THE DRAWINGS

Figure 1:
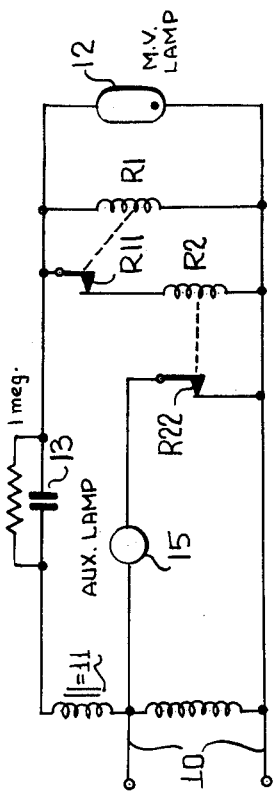
FIG. 1 is a circuit diagram of a first embodiment of the invention.

In FIG. 1, 10 is an a.c. 110. volt power line, which supplies power to an auto-transformer 11. The latter supplies voltage to a mercury vapor lamp 12 via a ballast capacitor 13. In parallel with the mercury vapor lamp 12 is a first relay coil R1, and in parallel with the latter a set of contacts R11 for relay coil R1, and a relay coil R2 which operates contacts R22.

An incandescent auxiliary lamp 15 is connected across the primary of transformer 11 via contacts R22.

The coil R1 is designed for continuous operation on 277. volts a.c., but coil R2 is designed to operate on 130. volts a.c. The pick-up voltages of each are somewhat lower.

At the start of a cold start operation, the mercury lamp has 15. volts thereacross initially, which rises to 135. volts over a period of several minutes. Contacts R22 are normally closed, so that they remain closed until 75.–85. volts are impressed across the mercury vapor lamp. At that point contacts R22 open, but the mercury lamp 13 is on. Relay R1 is not energized during this time, so that normally closed contacts R11 remain closed, and relay R2 remains energized.

Should power fail momentarily, the mercury lamp is turned off and requires minutes to turn on in a hot start. During hot start 270. volts exist across mercury tube 12. This voltage is sufficient to energize relay R1, which opens contacts R11 and permits contacts R22 to close. Auxiliary lamp 15 now turns on, and remains on through re-strike and until normal fired voltage across the mercury vapor lamp is increased beyond 75.–85. volts and stabilizes at approximately 135. volts.

No reliance is placed on the voltage occurring across ballast capacitor 13, and relays R1 and R2 are required to operate only at widely separated voltages.

Figure 2:
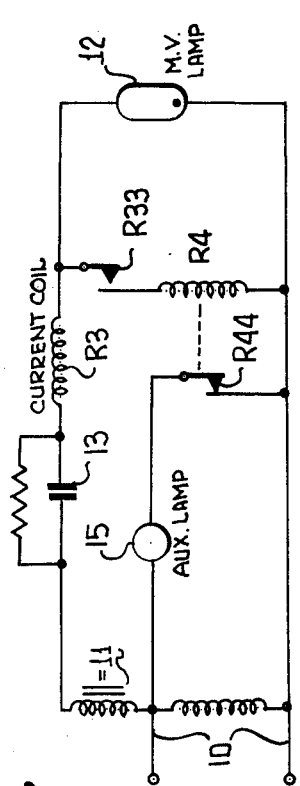
FIG. 2 is a circuit diagram of a second embodiment of the invention.

In FIG. 2, relay R3 is a current sensitive relay, responsive to currents in the mercury vapor lamp 12 during start and during fired condition. Contacts R33 are normally open and contacts R44 normally closed.

In cold start conditions, R44 is closed and the auxiliary lamp 15 is energized. Current through the relay coil R3 is sufficient to close contacts R33, and when the voltage across R4 achieves approximately 80. volts normally closed contacts R44 open and auxiliary lamp 15 de-energizes.

On hot start there is no current flowing through relay coil R3 and contacts R33 open. This takes the coil of R4 out of circuit and causes contacts R44 to close, thereby turning on the auxiliary lamp. When the arc in the mercury vapor lamp restrikes the contacts of R33 close and the conditions revert to those experienced during cold start.

Figure 3:
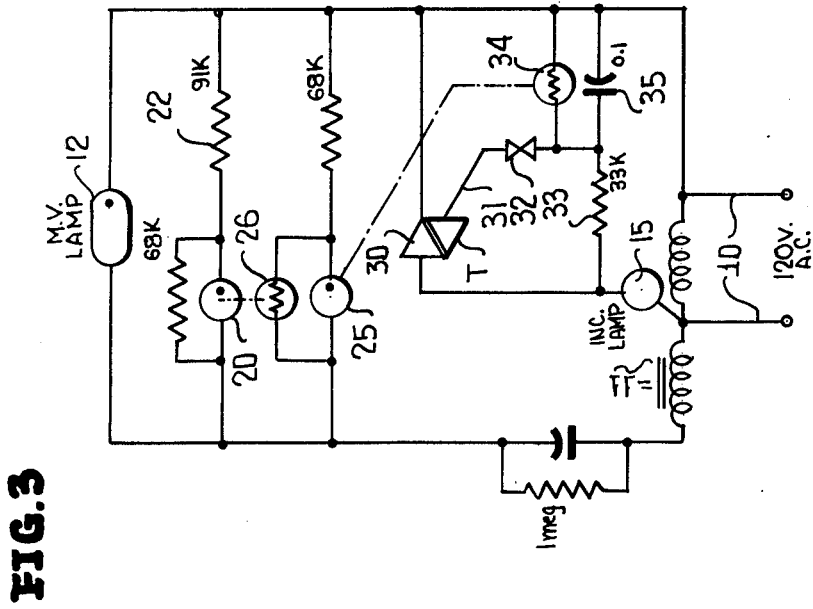
FIG. 3 is a wholly electronic version of the system of FIG. 1.

In FIG. 3, mechanical relays are dispensed with. In place of the relays of FIG. 1, there are connected across lamp 12 two parallel neon lamp circuits, one consisting of a neon lamp 20, shunted by a 68-K resistance 21, and both in series with a 91-K resistance 22; the other consisting of neon cell 25, shunted by a photo-cell 26, and both in series with 68-K resistance 27.

Incandescent or auxiliary lamp 15 is connected in series with triac 30, across the primary circuit of transformer 11. The gate or control electrode 31 of triac 30 is connected via diac 32 to a phase shift circuit, including resistance 33 in series with photo-cell 34 and capacitor 35 taken in parallel. So long as photo-cell 34 is not illuminated it presents an extremely high resistance, effectively an open circuit, across capacitor 35. This leaves resistance 33 and capacitor 35 operative as a phase shift circuit, which provides voltage at point 36 to fire the triac 30 via a diac 32, at times or phases designed to pass current through auxiliary lamp 15. When capacitor 35 is short circuited, as by photo-cell 34 when illuminated, the phase shift circuit is disabled or point 36 is grounded.

Neon lamp 20 and photo-cell 26 are optically coupled, as are neon lamp 25 and photo-cell 34.

Under cold start conditions, photo-cell 34 is not initially illuminated, and lamp 15 is therefore illuminated.

During cold start, the voltage across the mercury vapor lamp 12 is low and hence neither neon lamp 20 nor 25 is illuminated. Both photo-cells 26 and 34 have high resistances and are essentially out of circuit. The photo-cell 34 in parallel with the triac capacitor 35 has no shunting effect and the auxiliary lamp 15 is switched on.

As the illumination level increases, the voltage across the mercury vapor lamp 12 increases and eventually stabilizes at approximately 135. volts. As the voltage across neon cell 25 attains its firing voltage of 75. volts, the neon lamp 25 fires and its photo-cell 34 shunts the triac capacitor 35, thereby causing the auxiliary lamp 15 to be switched off. The neon lamp 20 is not illuminated at this time and hence its photo-cell 26 is essentially out of circuit. This occurs because the voltage divider for neon cell 20, i.e., resistances 21 and 22, do not provide 75. volts if the voltage across lamp 12 is less than 180. volts. This can be varied according to the needs of the particular circuit.

During the hot start the voltage across the mercury vapor lamp is approximately 270. volts. The neon lamp 20 is now illuminated. This causes its photo-cell 26 to drop its resistance and shunt the neon cell 25. This causes the neon lamp 25 to become extinguished and the photo-cell 34 which it controls reverts to its high resistance state. This essentially removes the photo-cell 34 from the circuit and the triac 30 switches the auxiliary light on. Once re-strike takes place, the voltage across the mercury vapor lamp 12 drops down to approximately 20. volts and the operation repeats itself as it does under normal cold start conditions.

A particularly simple embodiment of the present invention, employing two relays, becomes feasible if one of the relays may be connected across the ballast capacitor of the system. Such a system is illustrated in FIG. 4 of the accompanying drawings.

Figure 4:
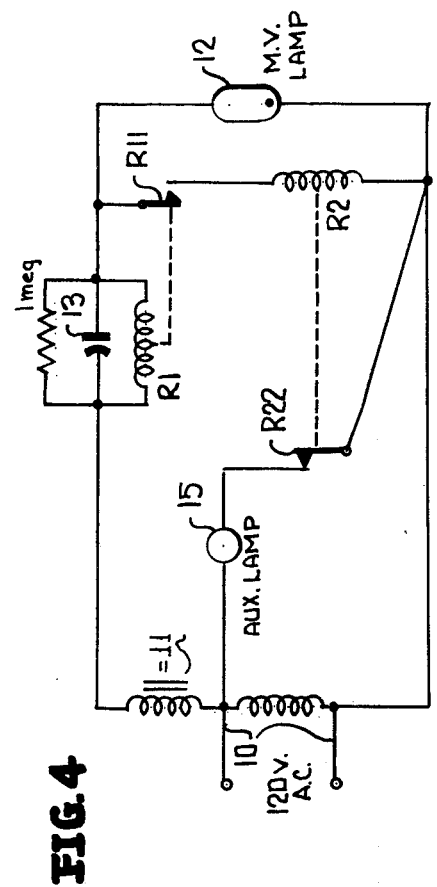
FIG. 4 is a circuit diagram of a further embodiment of the invention employing relay.

In FIG. 4, upon applying power via auto-transformer 11, auxiliary lamp 15 is energized via normally closed contacts R22. A relay coil R1 is connected across ballast capacitor 13, and has normally open contacts R11 in series with relay coil R2, and contacts R11 and coil R2 are connected in series across mercury lamp 12. Relay R1 is operable to close contacts R11 when about 420. volts appears across the capacitor 13.

When the system is energized, about 420. volts appears across capacitor 13, and contacts R11 close. Under cold start conditions about 20. volts appears across the lamp 12, but this voltage gradually increases to 135. volts as the illumination output of the lamp 12 increases. When the relay coil R2 attains about 75.–85. volts, the contacts R22 open, and auxiliary lamp 15 is de-energized.

Under hot start conditions little or no voltage appears across the capacitor, and contacts R11 remain open. Relay coil R2 is then open circuited and controls R22 remain closed. When the arc of the mercury vapor lamp re-strikes, the voltage across it falls to approximately 30. volts and the voltage across capacitor 13 increases to approximately 420. volts and this energizes the coil of R1 and contacts R11 close. The coil of R2 is now again in the circuit. The voltage across the mercury vapor lamp begins to increase and as it reaches 75.–85. volts relay coil R2 causes contacts R22 to open and auxiliary lamp 15 is de-energized.

In all the systems described, the relays can be designed to operate at different voltages, i.e., higher for mercury vapor lamps designed for 265. volts nominal operation.

In all the above systems any or all the relays coils placed across the mercury vapor lamp or capacitor may be connected in series with rectifiers, and be d.c. relays, if desired.

The sets of contacts R22, R44, R22 of FIGS. 1, 2 and 3, respectively, if these were ordinary contacts, would soon burn out, since the actuating coils for these relays are subject to a gradually increasing and decreasing voltage across these coils, equal to the voltages across the M.V. lamp 12. Should the relays R2, R4, R2 be of conventional types they would chatter as critical voltages were neared since the coils of these relays are subject to a.c. voltage. Should the relays chatter their lives would be short, due to arcing. Accordingly, a special relay is employed in the practice of the invention, to avoid chattering. This relay is illustrated in FIG. 5 of the accompanying drawings.

Figure 5:
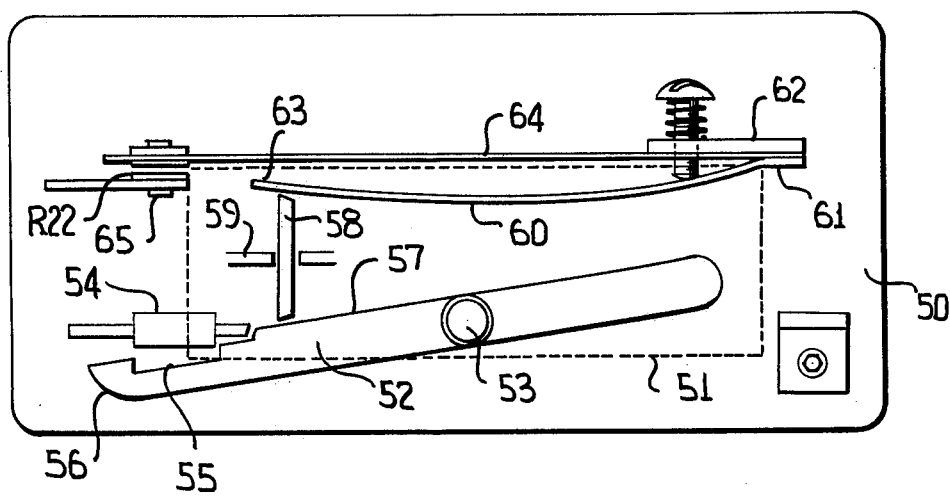
FIG. 5 is a side view of a relay employed in the systems of FIGS. 1, 2, and 4.

In FIG. 5, 50 is a panel board on which is mounted a relay having a coil 51, an armature 52 pivoted about a stud 53. The relay includes a pole piece 54, which engages with a notch 55 adjacent one end 56 of armature 52. An upper surface 57 of armature 52 engages the lower end of a movable plunger 58, which slides in guide 59. The upper end of plunger 58 engages a spring 60 of cantilever type. One end 61 of spring 60 is fixed to a ledge 62 extending from panel 50. The other end 63 of spring 60 sits slightly spaced from the under side of a movable switch arm 64, having a movable contact R22, normally in contact with a fixed contact 65. 66 is a tension adjusting screw, which extends through ledge 62, and adjusts the normal position of spring 60.

In operation, the armature 52 and the plunger 58 tend to follow the instantaneous amplitude of a sine wave, as that sine wave gradually increases in peak amplitude. The oscillating motion of the armature would result in rapid chatter over a considerable range of mean values of the a.c. voltage, which would rapidly destroy the contacts, were it not for the interposition of the spring 60. The oscillations of the plunger 58 are absorbed by the spring. Only when the coil 51 is energized at a sufficiently high level does the spring 60 move sufficiently to contact and actuate the blade 64, thereby providing a single clean opening of the contacts.

In any of FIGS. 1, 2, 4, the relay coils R2, R4 may be operated d.c., i.e., the coils as shown but connected in series with a diode. The use of non-chatter relays remains mandatory, since the a.c. signal applied to the relays is half wave rectified a.c., but the slow build up must still be contended with.

In the embodiment of FIG. 4 relay R1 is connected across a ballast capacitor. In this circuit it is essential that the capacitor discharge rapidly and fully. In FIG. 4 the coil resistance of R1 is selected to be so low as to assure this result.

What is claimed is:

1. A lighting system comprising, in combination, a high intensity discharge lamp, a first means to provide power to said high intensity discharge lamp, ballast means connected between said discharge lamp and said first power means, an auxiliary lamp, a second means to provide power to said auxiliary lamp, said second power means being electrically isolated from said first power means, and control means automatically responsive to hot and cold starting conditions for turning on said auxiliary lamp during and only during both hot and cold starts; said control means comprising first and second switching means; said first switching means comprising a first relay having a first coil and normally open pair of first contacts, said coil being connected in series with said discharge lamp and said ballast, said pair of contacts having a closed state when the current through said discharge lamp is greater than a first predetermined value and an open state when said current is less than said first predetermined value; said second switching means connected in series with said auxiliary lamp and said second power means; said second switching means being in a normally closed state and including additional means responsive to said first switching means to open said second switching means to place it into its open state; said auxiliary lamp being lit solely when said second switching means is in said closed state; said additional means being disabled by said open state of said relay contacts and enabled by said closed state of said relay contacts; when enabled by said relay contacts, said additional means being responsively coupled to the voltage across said high intensity discharge lamp and said second switching means having said closed state when said voltage is less than a second predetermined value and having said open state when said voltage is greater than said second predetermined value; when disabled by said relay contacts, said additional means being electrically decoupled from said high intensity discharge lamp, said second switching means being in said closed state when said additional means is so decoupled.

2. The system of claim 1 wherein said second switching means is a second relay, and said additional means is a second coil; said second relay including a normally closed second pair of contacts; said second relay contacts being connected in series between said second power means and said auxiliary lamp, and said second coil being connected in series with said first relay contacts across said discharge lamp.

3. The system of claim 2 wherein said second relay is a low chatter relay.

* * * * *